US005104699A

United States Patent [19]

Pantaleo et al.

[11] Patent Number: 5,104,699

[45] Date of Patent: Apr. 14, 1992

[54] PLACEMAT WITH FLOATING FIGURINE

[75] Inventors: Terese A. Pantaleo, Orland Park, Ill.; Donald E. Perrin, Clinton, Iowa

[73] Assignee: Integra Development International, Lemont, Ill.

[21] Appl. No.: 610,504

[22] Filed: Nov. 8, 1990

[51] Int. Cl.[5] .............................................. B32B 3/20

[52] U.S. Cl. ........................................ 428/13; 40/426; 273/457; 428/166; 428/321.5; 446/267

[58] Field of Search ....................... 446/267, 156, 159; 40/426; 215/100.5; 220/405, 406; 273/457; 428/13, 166, 321.5

[56] References Cited

U.S. PATENT DOCUMENTS

| | | | |
|---|---|---|---|
| D. 175,089 | 7/1955 | Newmark | 446/267 X |
| 2,703,087 | 3/1955 | Newmark | 446/267 X |
| 3,377,738 | 4/1968 | Goodrum, Jr. | 446/267 |
| 3,898,781 | 8/1975 | Facchini | 428/13 X |
| 4,057,921 | 11/1977 | Ball | 428/13 X |
| 4,359,224 | 11/1982 | Nottingham et al. | 428/166 X |
| 4,362,299 | 12/1982 | Suzuki | 446/267 X |
| 4,738,888 | 4/1988 | Pantaleo et al. | 428/13 X |
| 5,006,375 | 4/1991 | Mangan | 428/13 |
| 5,047,267 | 9/1991 | Pantaleo et al. | 428/13 |

FOREIGN PATENT DOCUMENTS

| | | | |
|---|---|---|---|
| 2094644 | 9/1982 | United Kingdom | 428/13 |

*Primary Examiner*—Henry F. Epstein
*Attorney, Agent, or Firm*—Wallenstein, Wagner & Hattis

[57] ABSTRACT

An article of manufacture, comprising a pair of superimposed pliable sheets. The sheets are interconnected along at least their peripheral edges. A liquid-containing chamber is provided at the center of the article, and this chamber is formed with the pair of superimposed, pliable sheets. A generally flat figurine within the chamber floats within the liquid, and a point of the figurine is secured to at least one of the pliable sheets to enable the figurine to float securely within and pivot about in the liquid.

6 Claims, 1 Drawing Sheet

PLACEMAT WITH FLOATING FIGURINE

DESCRIPTION

1. Technical Field

The present invention relates generally to an article of manufacture and, more particular, to a protective serving mat which may also act as an amusement device.

2. Background of the Invention

Protective serving devices, such as placemats and coasters, are used extensively for food and beverage products in various public facilities and in residential kitchens. Restaurants that cater to families may provide some type of amusement device for the children of those families, and these amusement devices may be a part of the placemats that are used for serving the food. For example, restaurants have been known to provide disposable paper placemats that embody various types of games to keep children occupied before, during and after meals.

Manufacturers are constantly striving to provide new and improved products that will provide a competitive advantage. These products must be reasonably priced, and thus relatively inexpensive to manufacture. Examples of improved devices in this field are disclosed in U.S. Pat. No. 4,738,888 (hereinafter the "'888 patent"), which was issued to the inventors of the present invention on Apr. 19, 1988. The '888 patent discloses a protective serving mat which includes a reusable amusement device.

Specifically, the '888 patent discloses a serving mat, including a pair of superimposed pliable sheets sealed to each other to define a chamber. The chamber contains a free-flowing medium such as water. A plurality of discreet articles are suspended in the liquid medium and are movable by manipulation of the liquid in the chamber. An upper sheet of the serving mat is transparent, so that the inner surface of a lower sheet of the serving mat and the contents of the chamber may be seen. The inner surface of the lower sheet of the serving mat carries fanciful indicia.

The '888 patent and all of the U.S. patent documents noted as being of record by the U.S. Patent Office during the prosecution of the '888 patent are incorporated by reference into this specification. These references includes U.S. Pat. Design No. 175,089, issued to Newmark; U.S. Pat. No. 2,703,087, issued to Newmark; U.S. Pat. No. 2,738,616, issued to Windle; U.S. Pat. No. 3,377,738, issued to Goodrum, Jr.; U.S. Pat. No. 3,898,781, issued to Facchini; U.S. Pat. No. 3,983,277, issued to Ackerman et al.; U.S. Pat. No. 4,359,224, issued to Nottingham et al.; U.S. Pat. No. 4,362,299, issued to Suzuki; U.S. Pat. No. 4,608,323, issued to Zaborney; and U.S. Pat. No. 4,631,210, issued to McGee et al.

Yet another example of a protective serving mat is disclosed in U.S. patent application Ser. No. 365,836, filed on June 13, 1989, now U.S. Pat. No. 5,047,267, by one of the inventors of the present invention. This application discloses a protective serving which is comprised of generally flat first and second chambers superimposed on each other. The first chamber is transparent and is adopted to contain a fluid medium and objects suspended in that fluid medium. The first chamber includes a resealable opening so that a user may access the first chamber to alter the contents. The second chamber is visible through the first chamber, and is used to protect and display generally flat items. The second chamber includes an opening to allow access to the chamber so that the generally flat items can be varied, as desired by a user. Typical of the flat items which may be interchanged are menus or indicia bearing papers.

This application and all of the references of record therein are also incorporated into this specification by reference. These references, exclusive of those that have already cited in connection with the '888 patent above, include U.S. Pat. No. 4,057,921, issued to Ball; U.S. Pat. No. 4,390,575, issued to Kopp; U.S. Pat. No. 4,528,224, issued to Ausnit; U.S. Pat. No. 4,561,109, issued to Herrington; U.S. Pat. No. 4,686,784, issued to Smithies; and U.S. Pat. No. 4,736,853, issued to O'Mara.

The '888 patent discloses a placemat having a small annular chamber 54. A liquid medium 56, such as colored water, is contained in that chamber. A plurality of discreet articles or objects are suspended in that liquid medium. These discreet articles or objects are movable by manipulation of the liquid within an annular channel defined by the chamber.

The inventors found that when larger discreet objects were placed within liquid- filled spaces, and left to float within those spaces, the free-floating objects would have a tendency to stick to one of the superimposed pliable sheets defining the liquid chamber in which those large objects were placed. Alternatively, the large free-floating objects had a tendency to turn over about their axis, which would impair the pleasing visual effect intended by the manufacturer. Accordingly, the inventors sought a way of providing such large objects with the free-floating effect, but without the potential drawbacks of prior systems.

SUMMARY OF THE INVENTION

The present invention is an article of manufacture which comprises a pair of superimposed pliable sheets. The sheets may be interconnected along at least their peripheral edges. A chamber or space is formed between and is defined by the pair of superimposed pliable sheets, and the chamber or space contains a liquid. This chamber is preferably at the center of the article of manufacture. A generally flat figurine is disposed within that chamber, and floats within the liquid. At least one point of the figurine is secured to at least one of the pliable sheets to enable the figurine to float within the liquid.

In another embodiment of the invention, the article of manufacture may also comprise a generally annular, fluid-containing channel. This annular channel is defined by an outer peripheral seam and an inner seam formed by the pliable sheets. The figurine in this embodiment is secured to the inner seam. The present invention permits the use of relatively large figurines within such articles of manufacture, and prevents or at least inhibits their tendency to stick onto one of the pliable sheets In addition, the securement of the figurine along the seam or along one of the pliable sheets enables the figurine to pivot about that seam. This gives the illusion that the figurine is floating within the liquid, and able to move within the chamber.

Accordingly, an object of the invention is an improved article of manufacture which creates an illusion of a floating figurine within a liquid filled chamber defined by two superimposed sheets.

DETAILED DESCRIPTION OF THE PREFERRED EMBODIMENT

Figure 1:
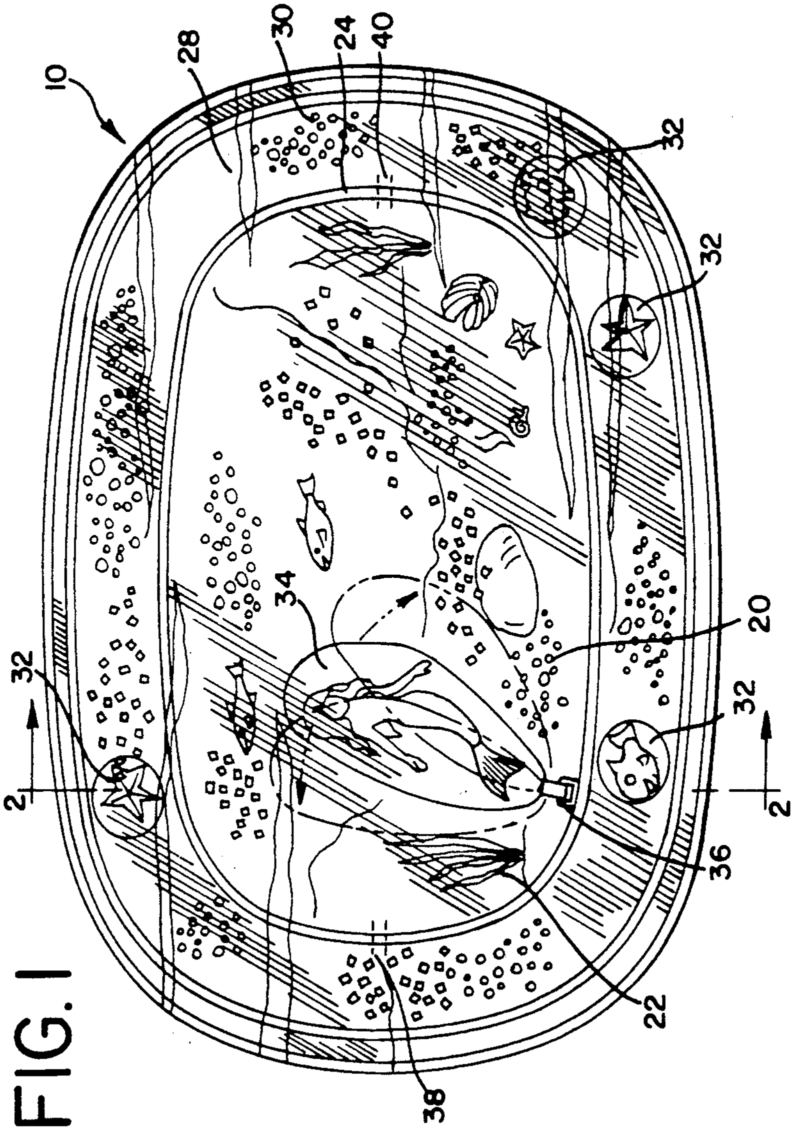
FIG. 1 is a plan view of a placement having the features of the preferred embodiment of the present invention.

While this invention is susceptible of embodiment in many different forms, there is shown in the drawings and described in detail in this specification preferred embodiments of the invention. It should be understood that the present disclosure is to be considered as an exemplification of the principles of the invention. There is no intent by the applicants to limit the broad aspect of the invention to the embodiments illustrated.

Turning first to FIG. 1 of the drawings, the preferred embodiment of the invention comprises a placemat 10. In the plan view of FIG. 1, this placemat 10 is generally oval-shaped, and consists of two superimposed pliable plastic sheets 12 and 14. Optionally, a third, stiff backing sheet 15 may be provided. Preferably, sheets 12 and 14 are made of a heat-sealable plastic material, such as polypropylene. The first sheet 12 is preferably transparent, for a reason to be described later.

Figure 2:
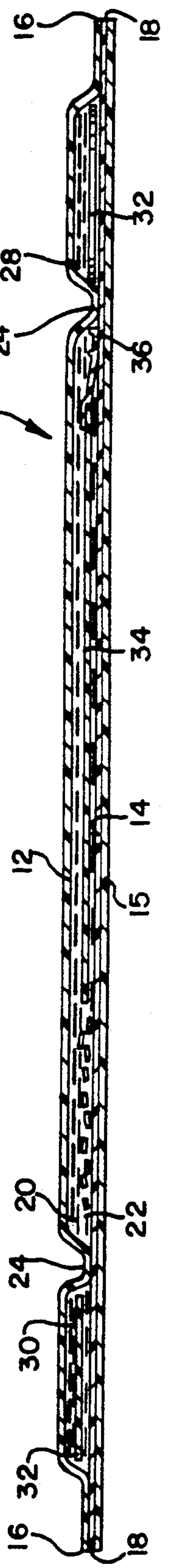
FIG. 2 is a cross-sectional view, taken along lines 2—2 of FIG. 1.

As may best be seen in FIG. 2, these sheets 12 and 14 have peripheral edges 16 and 18, and these edges are permanently joined by heat sealing. A central portion of the placemat 10 is also defined by separate heat-sealed portions of the sheets 12 and 14. Liquid 20 which is enclosed in a space or chamber 22 at this placemat center, and formed by these sheets 12 and 14, is securely retained in the placemat 10. The outer periphery of this space or chamber 22 is defined by the heat-sealed inner seam 24.

The heat-sealed peripheral edges 16 and 18 and the inner seam 24 together form an elongated, race track-like annular channel 28. Like the chamber 22, this channel 28 also contains a liquid 30. At least one movable object 32 in that channel 28 may be propelled around the channel 28, with the liquid 30 providing the driving force. Particularly, an individual may manipulate the liquid medium 30 within the channel 28, and the liquid 30 in turn propels the movable object 32 in the direction of the manipulated liquid 30.

The improvement in this invention comprises a generally flat figurine 34 secured at one point to either the inner seam 24, or to one of the pliable sheets 12 and 14. In FIGS. 1 and 2, this figurine 34 is secured to the inner seam 24. When secured at one point to the inner seam 24, the inventors have found that the figurine 34 will have a decreased tendency to stick to the pliable sheets 12 and 14. In addition, the figurine 34 will not turn or flip over about its axis.

Referring now to FIG. 1, a figurine 34 secured to the inner seam 24 will alternately pivot in a forward and rearward direction about its point of securement 36. This is shown by the arrows adjacent the figurine 34 in FIG. 1. This ability to pivot enables the figurine 34 to float upon and within the liquid 20 contained by the chamber 22. As it pivots about its point of securement 36, the figurine 34 also provides the illusion that it can move within that chamber 22. To the knowledge of the inventors, this is an illusion that has not provided by any prior art device.

The above embodiment contemplates that the liquids or fluids 20 and 30 in chamber 22 and channel 28 respectively will remain separate. In an alternate embodiment, however, openings 38 and 40 (shown in dotted lines in FIG. 1) may be provided to enable fluid communication between chamber 22 and channel 28. In this way, as the liquid 30 within the channel 28 is manipulated, and as this liquid 30 in turn propels the movable object 32 around that channel, some of the liquid 30 may enter chamber 22. In turn, liquid 20 within the chamber 22 becomes agitated, and assists in creating a further swaying motion of the flat figurine 34.

What I claim is:

1. An article of manufacture, comprising:
   a. a pair of superimposed pliable sheets, said sheets being interconnected along at least peripheral edges;
   b. a chamber between and defined by said pair of superimposed pliable sheets, said chamber containing a liquid; and
   c. a generally flat figurine within said chamber and floating within said liquid;

wherein a point of said figurine is secured to at least one of said pliable sheets to enable said figurine to pivot about and float within said liquid.

2. The article of manufacture of claim 1, further comprising a generally annular, fluid-containing channel, said annular channel defined by an outer peripheral seam and an inner seam formed by said pliable sheets, and wherein said figurine is secured to said inner seam.

3. The article of manufacture of claim 2, further comprising one or more openings enabling fluid communication between said chamber and said channel.

4. The article of claim 2, further comprising at least one movable object within said generally annular channel, wherein said at least one movable object may be propelled around said generally annular channel.

5. A placemat comprising a pair of superimposed pliable plastic sheets having heat-sealed peripheral edges, and being heat sealed between said edges to define at least an inner seam, said inner seam circumscribing an inner, liquid-filled chamber, and said peripheral edges and said inner seam forming an elongated channel having a liquid medium therein, at least one movable object in said channel with said liquid medium providing the driving force for said movable object when said liquid medium is displaced by contact with one of said sheets, the improvement comprising a generally flat figurine secured at one point to said inner seam and permitting said figurine to float within said inner, liquid-filled chamber.

6. An article of manufacture, comprising:
   a. a pair of superimposed pliable sheets, said sheets being interconnected along at least peripheral edges;
   b. a chamber between and defined by said pair of superimposed pliable sheets, said chamber containing a liquid;
   c. a generally flat figurine within said chamber and floating within said liquid;
   d. a generally annular, fluid-containing channel, said annular channel defined by an outer peripheral seam and an inner seam formed by said pliable sheets, a point of said figurine being secured to said inner seam; and
   e. one or more openings enabling fluid communication between said chamber and said channel, wherein said figurine pivots about said point and floats within said liquid.

* * * * *